H. W. BARDWELL.
HAND-STAMP.
No. 193,070. Patented July 17, 1877.
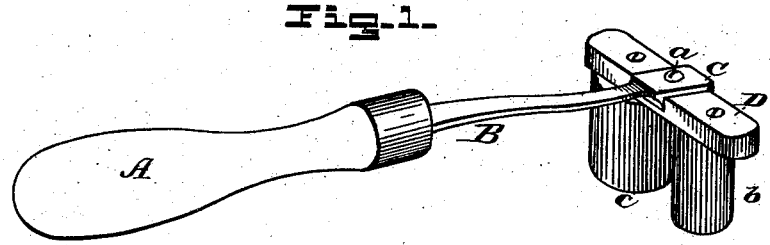
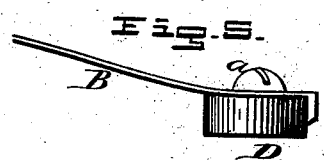
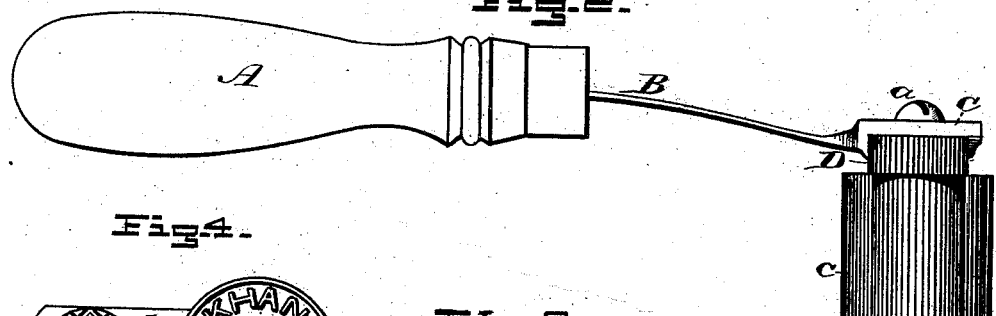
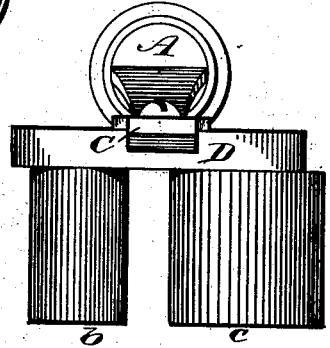
WITNESSES:
Jos. F. DuHamel.
H. B. Brown
INVENTOR:
H. W. Bardwell.
PEP
H. S. Abbot.
ATTORNEY.

UNITED STATES PATENT OFFICE.

H. WEBSTER BARDWELL, OF TUNKHANNOCK, PENNSYLVANIA.

IMPROVEMENT IN HAND-STAMPS.

Specification forming part of Letters Patent No. 193,070, dated July 17, 1877; application filed February 27, 1877.

*To all whom it may concern:*

Be it known that I, H. W. BARDWELL, of Tunkhannock, in the county of Wyoming and State of Pennsylvania, have invented certain new and useful Improvements in Hand Canceling-Stamps; and I do hereby declare that the following is a full, clear, and exact description thereof, which will enable others skilled in the art to which it appertains to make and use the same.

My invention relates to an improvement in marking and canceling stamps; and consists in the construction and arrangement of parts, as will be hereinafter more fully set forth.

In order to enable others skilled in the art to which my invention appertains to make and use the same, I will now proceed to describe its construction, reference being had to the accompanying drawings, which form a part of this specification, and in which—

Figure 1 is a perspective view. Fig. 2 is a side view. Fig. 3 is an end view. Fig. 4 is a bottom view, showing the marker and canceler; and Fig. 5 shows a form of attachment of shank to head-piece.

A is the handle, provided with a spring-shank, B, extending to, and embracing, the head-piece D.

In one form of my device I terminate the shank B in the end C, (shown in Figs. 1 and 2,) recessed to receive the head-piece D, which has the cancel *b* and type-box *c* attached to it.

In another form of my device I turn down the end of the shank B, as shown in Fig. 5, making an arm to embrace the head-piece D and aid the screw *a*, which retains the head-piece in place.

The shank B has sufficient elasticity to relieve the hand and arm from the shock caused by the blow.

Having thus fully described my invention, what I claim as new, and desire to secure by Letters Patent, is—

The combination of the handle A, spring-shank B, extending to and embracing the head-piece, and head-piece D, substantially as shown and described.

In testimony that I claim the foregoing as my own I affix my signature in presence of two witnesses.

H. W. BARDWELL.

Witnesses:
F. C. ROSS,
F. C. BUNNELL.